(12) United States Patent
Miloslavsky

(10) Patent No.: US 6,201,863 B1
(45) Date of Patent: *Mar. 13, 2001

(54) PERSONAL DESKTOP ROUTER

(75) Inventor: Alec Miloslavsky, San Carlos, CA (US)

(73) Assignee: Genesys Telecommunications Laboratories, Inc., San Francisco, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/802,667

(22) Filed: Feb. 19, 1997

Related U.S. Application Data

(63) Continuation-in-part of application No. 08/797,420, filed on Feb. 10, 1997.

(51) Int. Cl.[7] .................................................. H04M 3/00
(52) U.S. Cl. ...................... 379/242; 379/219; 379/220; 379/221; 379/265; 379/266; 379/309
(58) Field of Search ................................. 379/93.17, 201, 379/207, 219, 220, 221, 229, 230, 242, 265, 115, 127, 196, 266, 267, 309; 395/611

(56) References Cited

U.S. PATENT DOCUMENTS

| | | |
|---|---|---|
| 4,290,141 | 9/1981 | Anderson et al. .................... 455/2 |
| 4,320,256 | 3/1982 | Freeman ............................. 179/6.04 |
| 4,345,315 | 8/1982 | Cadotte .............................. 364/900 |
| 4,355,207 | 10/1982 | Curtin ................................. 179/18 |
| 4,355,372 | 10/1982 | Tarshis et al. ..................... 364/900 |
| 4,439,636 | 3/1984 | Newkirk et al. ..................... 179/7.1 |

(List continued on next page.)

OTHER PUBLICATIONS

Call Centers Go Online—Communications Week.

*Primary Examiner*—Krista Zele
*Assistant Examiner*—Bing Bui
(74) *Attorney, Agent, or Firm*—Donald R. Boys; Central Coast Patent Agency

(57) ABSTRACT

A personal telephone call router adapted to execute on a personal computer (PC) connected to a local area network (LAN) wherein the LAN is also connected to a computerized telephony switching system has a graphic user interface allowing an individual user to route incoming calls from his/her PC by drag-and-drop techniques. In some embodiments the user may also customize routing rules for incoming calls. In preferred embodiments incoming calls are directed in the telephony switch to a virtual routing destination. In some cases each individual user is associated with a specific virtual destination, and in others data associated with each call is broadcast on the LAN to be filtered at each PC on the Lan running a personal router according to an embodiment of the invention.

9 Claims, 3 Drawing Sheets

U.S. PATENT DOCUMENTS

| | | | |
|---|---|---|---|
| 4,451,700 | 5/1984 | Elder et al. | 179/2 |
| 4,489,438 | 12/1984 | Hughes | 381/51 |
| 4,517,410 | 5/1985 | Carley et al. | 179/6.04 |
| 4,521,643 | 6/1985 | Dupuis et al. | 179/2 |
| 4,523,055 | 6/1985 | Hohl et al. | 179/2 |
| 4,528,643 | 7/1985 | Freeny, Jr. | 364/900 |
| 4,539,435 | 9/1985 | Eckmann | 179/2 |
| 4,559,415 | 12/1985 | Bernard et al. | 179/2 |
| 4,566,030 | 1/1986 | Nickerson et al. | 358/84 |
| 4,577,062 | 3/1986 | Hilleary et al. | 179/2 |
| 4,577,067 | 3/1986 | Paul et al. | 179/99 |
| 4,578,700 | 3/1986 | Shrier et al. | 358/84 |
| 4,580,012 | 4/1986 | Matthews et al. | 179/18 |
| 4,584,602 | 4/1986 | Nakagawa | 358/84 |
| 4,587,379 | 5/1986 | Masuda | 179/2 |
| 4,598,367 | 7/1986 | Defrancesco et al. | 364/408 |
| 4,603,232 | 7/1986 | Shababb et al. | 179/2 |
| 4,611,094 | 9/1986 | Gawrys et al. | 179/7.1 |
| 4,625,276 | 11/1986 | Benton et al. | 364/408 |
| 4,630,200 | 12/1986 | Tateisi et al. | 364/405 |
| 4,630,201 | 12/1986 | White | 364/408 |
| 4,634,809 | 1/1987 | Trok et al. | 379/91 |
| 4,649,563 | 3/1987 | Gerard et al. | 379/97 |
| 4,654,482 | 3/1987 | Deangelis | 379/95 |
| 4,667,287 | 5/1987 | Allen et al. | 364/200 |
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |
| 4,756,020 | 7/1988 | Fodale | 379/112 |
| 4,757,267 | 7/1988 | Riskin | 379/113 |
| 4,763,191 | 8/1988 | Gordon et al. | 358/86 |
| 4,785,408 | 11/1988 | Britton et al. | 364/513.5 |
| 4,788,715 | 11/1988 | Lee | 379/84 |
| 4,812,843 | 3/1989 | Champion, III et al. | 340/905 |
| 4,866,756 | 9/1989 | Crane et al. | 379/88 |
| 4,893,328 | 1/1990 | Peacock | 379/67 |
| 4,896,345 | 1/1990 | Thorne | 379/67 |
| 4,908,850 | 3/1990 | Masson et al. | 379/88 |
| 4,953,204 | 8/1990 | Cuschleg, Jr. et al. | 379/266 |
| 4,972,461 | 11/1990 | Brown et al. | 379/67 |
| 5,001,710 | 3/1991 | Gawrys et al. | 370/110.1 |
| 5,017,917 | 5/1991 | Fisher et al. | 340/825.79 |
| 5,036,535 | 7/1991 | Gechter et al. | 379/210 |
| 5,164,983 | 11/1992 | Brown et al. | 379/265 |
| 5,256,863 | 10/1993 | Ferguson et al. | 235/383 |
| 5,261,096 | 11/1993 | Howard | 395/650 |
| 5,278,977 | 1/1994 | Booth | 395/575 |
| 5,280,625 | 1/1994 | Howarten et al. | 395/200 |
| 5,343,477 | 8/1994 | Yamada | 371/8.2 |
| 5,392,400 | 2/1995 | Berkowitz et al. | 395/200 |
| 5,444,774 | 8/1995 | Friedes et al. | 379/266 |
| 5,455,903 | 10/1995 | Jolissaint et al. | 395/155 |
| 5,528,678 | 6/1996 | Kaplan | 379/201 |
| 5,530,744 | 6/1996 | Charalambus et al. | 379/265 |
| 5,583,922 | * 12/1996 | Davis et al. | 379/207 |
| 5,621,789 | * 4/1997 | McCalmont et al. | 379/265 |
| 5,630,127 | * 5/1997 | Moore et al. | 707/104 |
| 5,768,360 | * 6/1998 | Reynolds et al. | 379/220 |
| 5,974,414 | * 10/1999 | Stanczak et al. | 707/6 |

\* cited by examiner

Sample of broadcast announcement record

Sample User Interface Screen

PERSONAL DESKTOP ROUTER

CROSS-REFERENCE TO RELATED DOCUMENTS

The present application is a Continuation-In-Part of the copending patent application entitled "A Personal Desktop Router" filed on Feb. 10, 1997 by the same inventor, case P3205 application No. 08/797,420 which is incorporated herein in its entirety by reference.

FIELD OF THE INVENTION

The present invention is in the area of telephone call processing and switching, and pertains more particularly to intelligent call-routing, systems, and equipment and methods for customizing and Personalizing Routing Rules and Protocol.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing systems, with routing done both at or near point-of origin of incoming calls, and at call destinations. For example, systems are known to the present inventor that perform initial call processing before routing an incoming call to a destination switch, and further routing is done at the call destination in computerized telephony equipment, often termed customer premises equipment (CPE). The present invention pertains most particularly to routing at customer premises.

There are, at the time of the present patent application a considerable range of CPE systems available for use from various manufacturers, and, as state-of-the-art routing systems are typically computerized, there is a broad variety of software available for such systems as well. It is the software in general wherein routing rules are set, and the routing rules determine the decision-making paths a system follows in routing calls.

In current art, although there are widely varying systems in the art relative to routing rules, all such systems exhibit a common drawback. Typically such systems, once set up (programmed) to follow certain routing rules and practices, cannot easily vary, and individual users or groups of users, cannot change the rules arbitrarily. To tinker with the routing rules in CPE typically requires a highly-trained maintenance technician (system administrator).

What is clearly needed is method and apparatus which allows an individual user of a routing system, or a group of users, to alter and customize the routing rules of the system for particular purposes, which may change from time to time, depending on the users.

SUMMARY OF THE INVENTION

In a preferred embodiment of the present invention a method for routing telephone calls at customer premises is provided, comprising steps of (a) receiving a call at a telephony switch coupled to a customer local area network (LAN); (b) forwarding an indication of the received call to a personal computer (PC) connected to the LAN and displaying an indicator of the call on a video display unit (VDU) connected to the PC, wherein the PC executes a personal router application; (c) determining routing for the call in the personal router application; and (d) sending routing commands or requests effecting further routing of the call to the telephony switch as a result of the personal routing determined in step (c).

In some embodiments a facility is also provided including a user interface providing capability for a user to edit routing rules. In this case there is provided an-on screen window with editable script in a high-level language.

In preferred embodiments the PC includes a graphical user interface having icons indicating telephone calls received and other icons for choices of disposition of telephone calls received, and a user can precipitate actions in call routing by iconic drag-and-drop procedures.

In another aspect of the present invention, for a customer premises telephone call-routing system, a method is provided for individual customization of routing rules for an incoming telephone call, comprising steps of (a) calling a user interface on a computer connected to a customer LAN, the LAN also coupled to a computerized telephony switch system receiving the incoming telephone call, wherein the telephony switch system is adapted to broadcast data associated with incoming call on the LAN prior to routing the incoming call; (b) editing routing rules at the user interface; (c) associating the edited routing rules with the broadcast data; and (d) instructing the computerized telephony switch system to route the incoming call according a specific routing determined by the edited routing rules.

In yet another aspect a personal telephone call router for determining routing of incoming telephone calls in a customer premises telephone call switching system is provided, comprising a graphic user interface displayable on a display screen of a computer workstation and adapted to display first icons indicating incoming telephone calls and second icons indicating disposition of the incoming telephone calls; and an instruction transmitter adapted for transmitting routing instructions on the LAN to which the computer workstation is connected. In this embodiment drag and drop procedures executed by the user with the first and second icons generate instructions transmitted on the LAN to effect call routing.

In yet another aspect a customer premises telephone call routing system is provided comprising a computerized telephony switch system having one or more incoming telephone lines; a customer local area network (LAN) coupled to the computerized telephony switch system; a computer workstation including a display connected to the LAN; and a personal telephone call router executable on the computer workstation. In this embodiment the personal telephone call router comprises a graphic user interface (GUI) displayable on a display screen of the computer workstation, the GUI adapted to display first icons indicating incoming telephone calls and second icons indicating disposition of the incoming telephone calls, and an instruction transmitter adapted for transmitting routing instructions on the LAN to which the computer workstation is connected. Drag and drop procedures executed by the user with the first and second icons generate routing instructions transmitted on the LAN.

In various embodiments of the invention personal routing in real time is made possible, wherein individuals at call centers and other organizations may exercise close and immediate control of calls meant to come to come within their individual spheres of influence. Considerable advancement in the art of call routing and new and previously unavailable functions and capabilities are provided.

BRIEF DESCRIPTION OF THE DRAWING FIGURES

DESCRIPTION OF THE PREFERRED EMBODIMENTS

Figure 1:
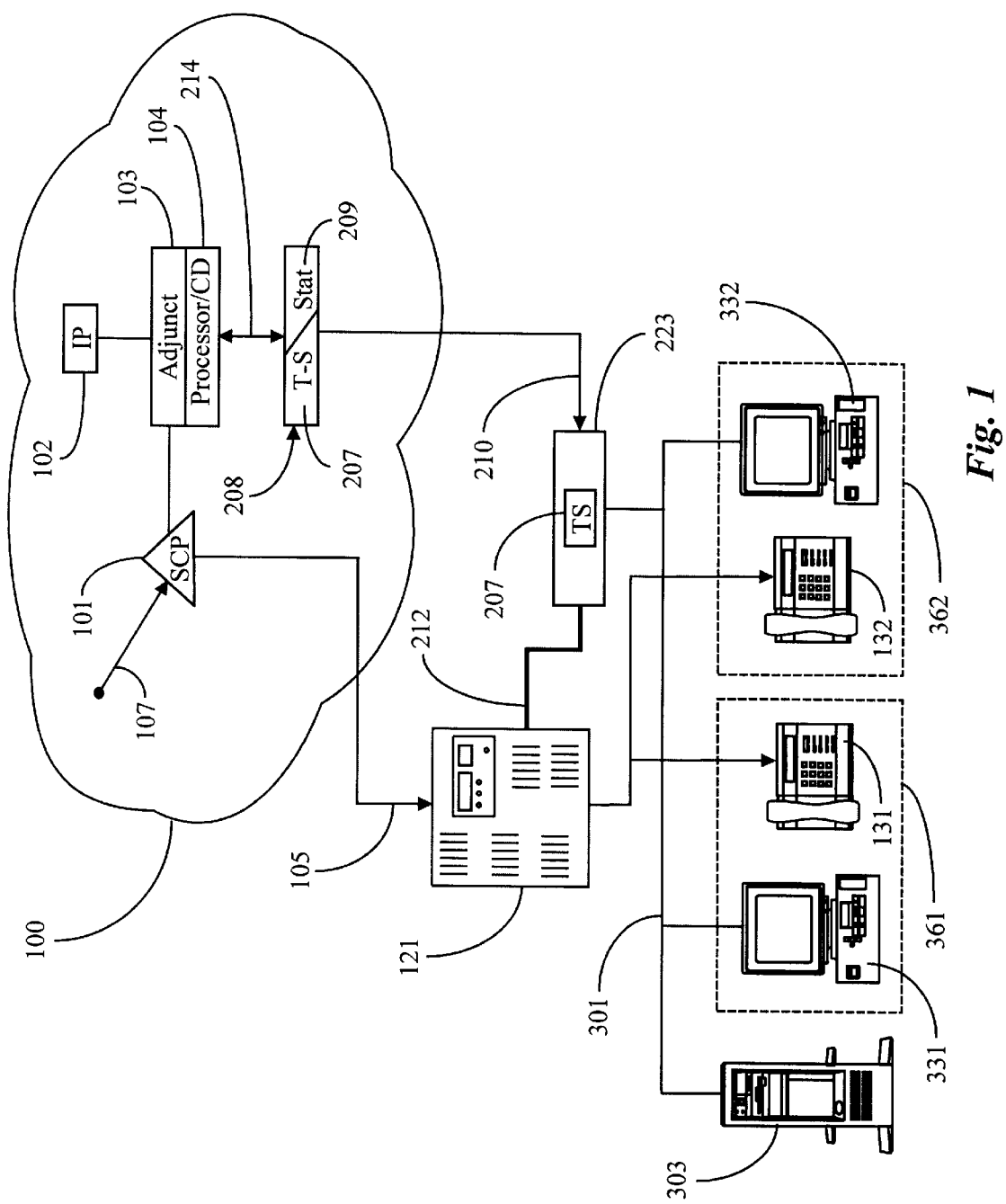
FIG. 1 is a system diagram of a call-routing system in an embodiment of the present invention.

FIG. 1 is a system diagram of a call-routing system according to a preferred embodiment of the present invention. Dotted lines 123 enclose elements of the system native to a customer's premises (CPE). This equipment in a preferred embodiment comprises a computerized telephony central switch 121 connected by a data link 212 to a processor 223 running an instance of a unique telephony server (T-Server) T-S 207. Switch 121 in conventional art distributes incoming calls (on line 105) to connected telephones, such as telephone 131 at a workstation 361 and telephone 132 at a second workstation 362. In various embodiments of the present invention T-Server 207 running on processor 223 exerts controlling influence on routing of incoming calls, as is described in further detail below.

In various embodiments of the present invention each workstation (361, 362) has a PC with a video display, such as PCNVDU 331 at workstation 361 and PCJVDU 332 at workstation 362. There will be in most architectures many more than the two telephone workstations shown, each with an associated PC, but two are considered adequate by the inventors to illustrate embodiments of the present invention.

PC/VDUs 331 and 332 in various embodiments are connected on a local area network (LAN) 301 which also connects to a data file server 303 and to processor 223 running an instance of T-Server 207. The arrangement of PCNVDU plus telephone at each workstation is a common arrangement for many company facilities, and has become more common as more and more people become computer literate. Moreover, many companies are actively training employees in use of computers, and providing PC-type computer equipment, usually interconnected by company LAN, for employees to use.

In the exemplary system shown, calls may originate at any remote call-in point, which is represented in FIG. 1 by region 100, referred to herein as the network cloud. Network cloud 100 may be a small regional portion of the world-wide network of connected telephony equipment, or may represent the entire world-wide network. An incoming call at any point in network cloud 100 is represented by vector 107 to service control point (SCP) 101 (typically a telephony central switch), which in this example is connected to an adjunct processor 103 and coupled thereby to an intelligent peripheral (I-P) 102, a distribution processor 104 and a processor 208 running a second instance of unique T-Server 207 as well as a statistical server (stat-server) 209. In this system calls are forwarded to switch 121 at the customer premises equipment over telephone line 105, and associated data is forwarded in parallel to processor 223 over a digital network link 210. Such systems, wherein data associated with a call is forwarded on a separate link from the call itself, are, to the inventor's knowledge at the time of the present patent application, not known in the art, but are known to the inventor. This feature, however, is not required in practice of the present invention, but preferred in some embodiments.

In embodiments of the present invention a call originating in the network cloud and routed to switch 121, destined for one of telephones 131 or 132 or to another destination at the customer's premises, typically carries a destination number, which may include a direct inward dialing (DID) feature, whereby a limited number of lines may be used to carry calls to a larger number of final destinations, accomplished principally by software techniques. Destination may also be to a virtual number, of which many may be programmed, and T-Server 207 may be adapted to further route calls forwarded to such virtual numbers. The phone call may also have caller ID attached (originating caller's phone number), and in those cases wherein a separate network digital data link is accomplished between processors at the origination end (208) and the customer's premises (223) cases a data packet associated with the call may be forwarded over link 210. Also, T-S 207, which interacts continuously with switch 121 in this embodiment, is capable of transacting with data file server 303, given caller ID and/or other data associated with a call, to retrieve further information about the caller from data file server 303.

It will be apparent to those with skill in the art that incoming calls are not limited to two telephones as shown in FIG. 1. There may be many more than two telephones connected to switch 121, other telephony equipment, such as facsimile equipment and data lines may also be connected and involved in routing decisions and transactions according to embodiments of the present invention. Moreover, existing techniques, such as virtual expansion for routing calls with a certain number to multiple destinations on some preprogrammed protocol may also be involved. The simple diagram of a switch with two telephones connected is meant to be illustrative for description of embodiments of the present invention.

It will be apparent to those with skill in the art as well, that a separate processor shown as processor 223 in FIG. 1, is not strictly required in embodiments of the invention, depending on the level of machine intelligence and sophistication of switch 121. Switches for customer premises continue to be developed with new levels of intelligent capability, and some may be capable of interacting with other elements of the present invention without a separate processor between the switch and a LAN such as LAN 301. Processor 223 will be required to practice various embodiments of the invention with many existing telephony switches which may be used as element 121. In virtually all cases in practicing the present invention, an instance of unique T-Server 207 executing on a computerized platform will be required.

In a preferred embodiment of the present invention routing intelligence is no longer confined to a central location such as telephony switch 121 or T-Server 207 running on a connected processor, but distributed in a manner that individual users of the system may customize routing at their own workstations, using individual PCs. This is accomplished in large part by control code executable at a user's computer workstation. It is not required that the actual code be always at the user's workstation, as it may be shared code resident at, for example a file server on LAN 301, such as file server 303. The unique code may be accessed from such a server and executed at any one of several workstations such as workstations 361 and 362 by PCNVDU 331 and PCN-VDU 332 respectively. The location of stored code, and access to such code is not, however germane to the invention. In embodiments of the invention, an individual PC executes unique code to provide call-routing control for an individual.

In embodiments of the present invention, T-Server 207 is adapted to cooperate with code executed at individual PCs to route incoming calls. In this unique routing process there are at least two different mechanisms that may be used. In one mechanism, all calls are routed to a single routing point, and each individual routing application registers with that routing point. In this case a record of each call is broadcast on LAN 301, as will be described more fully below, and filtering occurs at each PC router. In a second mechanism there may be a virtual routing point for each PC using a personal router on the LAN. In this second case there is no need to broadcast call particulars on the LAN. This second alternative is typically more expensive than the first, and there are currently rather severe limitations on how many automatic call distribution (ACD) queues or routing points may be allocated on a typical central switch.

Figure 2:
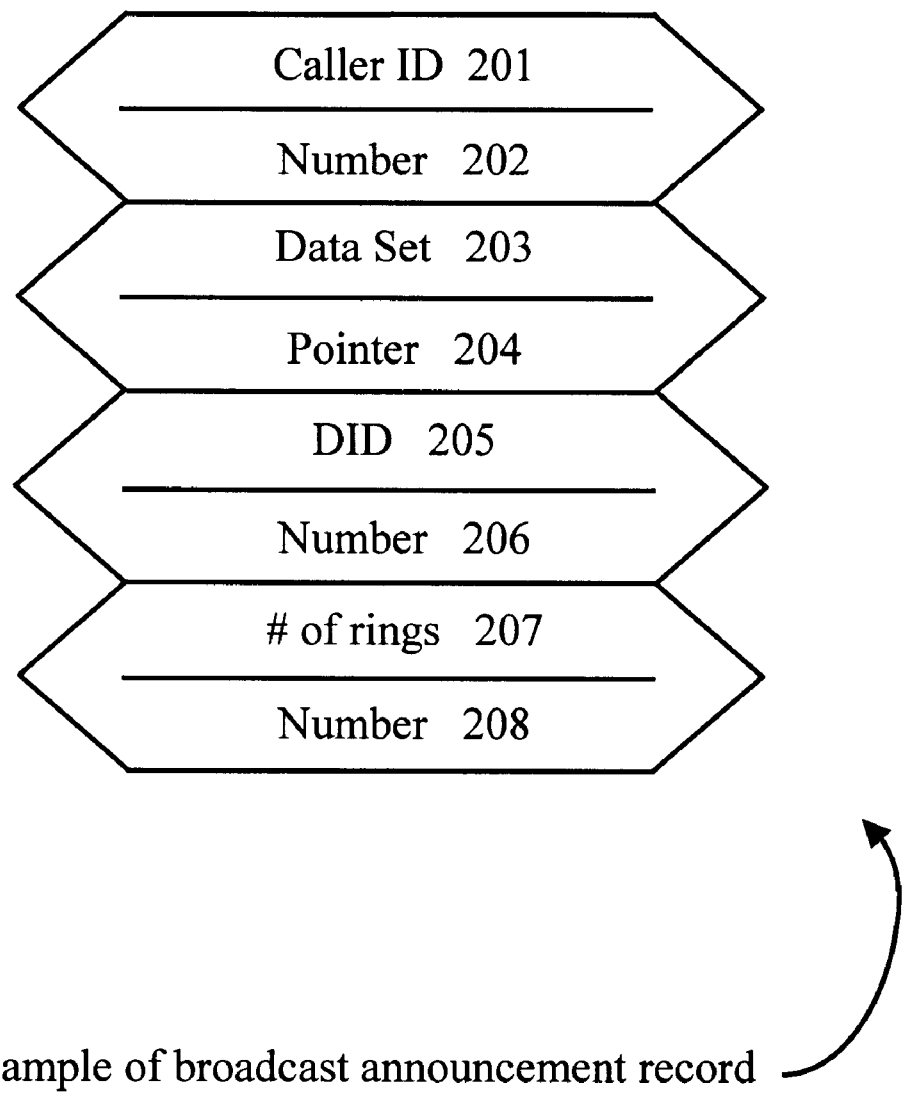
FIG. 2 is a sample of a broadcast announcement record in an embodiment of the present invention.

Referring now to FIG. 2, and presuming the first of the two mechanisms described immediately above, with each incoming call, an overall record of the call, prior to routing, is broadcast on LAN 301. This overall record can take a number of different forms, of which the example in FIG. 2 is just one exemplary form. In this example the overall record consists of four data portions. One data portion consists of elements 201 and 202. Data element 201 identifies this portion as the caller ID associated with the incoming call, and element 202 is the caller ID number. A second data portion consists of data elements 203 and 204. This portion is a data set which may be transmitted via link 210 to processor 223 in parallel with the incoming call, or may be composed partly of data retrieved from server 303, using other call data as a pointer. Element 203 identifies the data as a data set, and element 204 is the pointer. Similarly elements 205 mad 206 constitute a direct inward dialing (DID) number, and elements 207 and 208 fix number of rings.

A central element in the present invention is that a user at an individual PC runs an instance of a personal router application, providing that user with instant and complete control over routing of calls meant for that user (or, in some cases, associated users). The user's PC, such as PC/VDU 331 is connected typically by LAN to a processor such as processor 223, in turn connected to the central switch, such as switch 121.

At the computer portion of an individual workstation, such as PC/VDU 331 at workstation 361, the user has access to the local application which is interactive with code executed at T-Server 207 at processor 223, to control and customize routing for incoming calls, depending on certain data elements in the broadcast announcement record (FIG. 2). As a part of this unique capability to program routing responses, the individual user may in some embodiments load to his/her VDU a unique user interface, an example of which is shown in FIG. 3.

Figure 3:
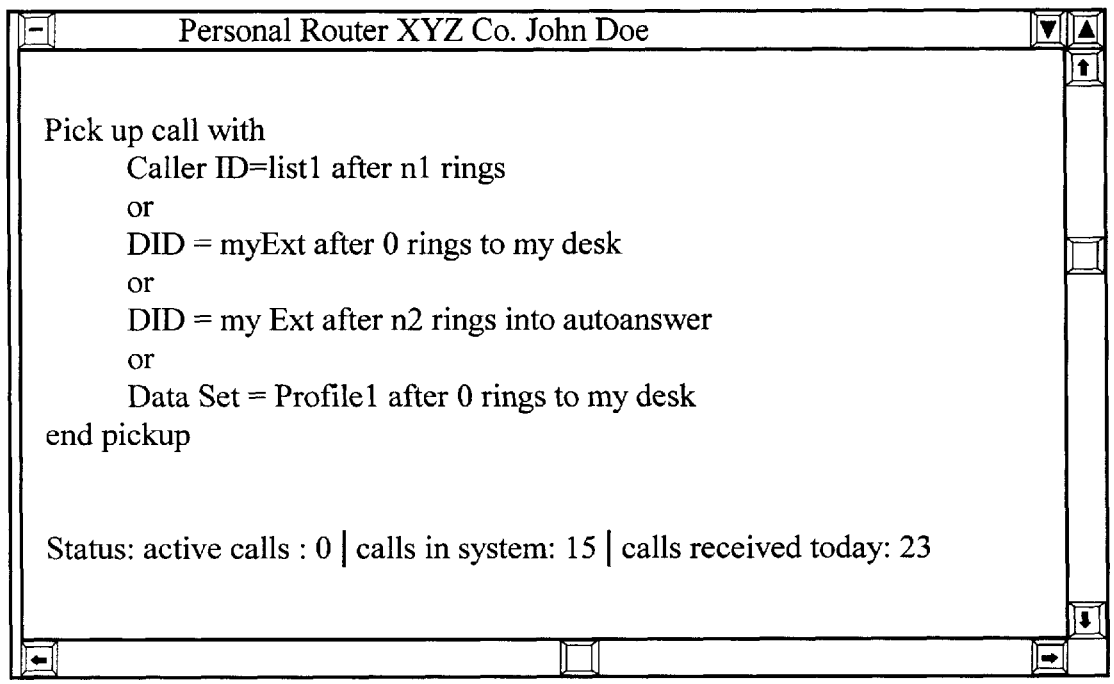
FIG. 3 is a sample user interface screen in an embodiment of the present invention.

FIG. 3 illustrates a window presentable to a user at an individual workstation, compatible, for example, with Windows operating systems. This is an input and display interface for a personal router, a variation of which may be assigned to each of selected employees to provide these individuals with an ability in conjunction with the premises telephone equipment to customize and periodically adjust the routing of certain incoming calls. In this example, the interface is for company XYZ and limited to employee John Doe.

Through the individual interface, John Doe in this instance, may program in a relatively high-level language, routing preferences for certain incoming calls, according to data broadcast for such calls on LAN 301. In the case where each user has a dedicated routing point, an incoming call is directed to the individual's computer, and the broadcast is not necessary.

In this example John Doe has programmed his interface to pick up all calls having Caller ID matched with a list "list1" after n1 rings. List1 is resident in John Doe's database associated with his own Personal Router, and John Doe may call up this list and amend, delete, and expand it as he wishes. The number of rings n1 may be any convenient number to accomplish John's purpose.

John Doe may program negative lists as well. Although not specifically recommended, a negative list could be used to hang up on all calls that have an ID associated with a company or individual that has been making harassing calls to an employee, or to shunt such calls to a special tracking program or the like.

John Doe in this instance has also programmed his personal router to send all calls bearing his assigned DID number to the telephone at his desk after 0 rings, and to an answering machine after n2 rings. Associations with data sets may also be made, comparing such data sets to stored profiles and the like. At the bottom of the display in this example a status summary of calls may be provided. A user may choose to have this window resident on his computer screen as a pix-on-pix, or to hide it and call it as needed. Also, it will be apparent to those with skill in the art that it is not strictly required that each selected person having an associated routing interface as signed have a computer at his/her elbow. For those persons not, for one reason or another, inclined to program their own routing, the interface may be called up and done by another, with appropriate access security applied. A secretary or system administrator may perform such functions, using any workstation connected to company LAN 301.

The user interface at the user's workstation can take any of a variety of forms, and have a variety of functionality. Typically, when the user logs on, his system will be configured to execute the unique application to run in the background, and to monitor for incoming calls at all times the user is present and active. It will be apparent to those with skill in the art that this can be done in a variety of ways. The interface, for example, may be a Graphic User Interface (GUI) wherein icons may be used to represent calls, callers, and other users, and the individual user at one workstation may select to display icons as desired. In this alternative embodiment an incoming call may appear on a user's PC VDU as a small telephone in an announcement bar. Such announcement bars are familiar to those with skill in the art, such as seen on Operating System Desktops, where an e-mail arrival may be indicated by a letter icon and a sound.

In such an embodiment, by moving the screen cursor to the telephone icon, which may be programmed to "ring" or to vibrate as though it is ringing, the user may activate a text balloon announcing the caller ID or other call data, or such data may be displayed directly in the icon. The system can be configured in such an embodiment to allow the user to route the call to his own phone with a click, to hang up with a double click, to drag the call to a holding queue (represented by a basket, for example,) to send the call to an answering machine, which may be done by dragging and dropping the telephone icon to an answering machine icon, to transfer the call to another person by dragging and dropping the telephone icon to an icon representing another user (such as the instant user's secretary or supervisor for example). Those with skill in the art will recognize that the functionality through the use of click and drag-and-drop procedures is very broad indeed.

Actions taken at the personal router interface at an individual PC on LAN 301 in embodiments of the present invention are codified as instructions on the LAN to T-Server 207 (in most cases) running on a processor such as processor 223, connected to central switch 121. If an individual user at a workstation, for example, has received an indicator of a waiting call, and has dragged the ringing telephone to his secretary's desk icon in his interface, his personal router interacts with T-Server 207 to instruct switch 121 to reroute the call to the secretary's telephone. In a similar manner, most actions at a personal router become instructions to switch 121, and in general each user having access to such a personal router can program responses to calls and respond to incoming calls in real time with a broad set of available responses.

In embodiments of the invention, not necessarily all calls are routed by personal routers executed on PCs on LAN 301. There may also be overriding routing rules programmed into switch 121, such that certain calls or types of calls are always handled in a certain way. Rules in switch 121 may also determine the fate of calls that are not eventually routed by personal routers. For example, all calls alive after seven rings may be switched to a recorded announcement, and the like. In this manner a very broad freedom of routing may be accomplished, with security and flexibility to adapt for changes in the organization.

It will be apparent to those with skill in the art that the division of code and functionality between server 303, T-Server 207 running on processor 223, and individual workstations on the LAN is somewhat arbitrary, with the requirement that individuals at the workstations have interface access to customize and update personal routing rules.

It will be apparent to those with skill in the art that there are many alterations that may be made in the embodiments of the invention herein described without departing from the spirit and scope of the invention. Some of these have been described above, such as the use of a telephony server like T-Server 207 running on processor 223. In some cases such a server is not needed to practice the invention, as was described above.

Many of the functional units of the system in embodiments of the invention may be implemented as code routines in computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the present invention in it's several aspects described. The invention is limited only by the breadth of the claims below.

What is claimed is:

1. A method for routing telephone calls to a plurality of individual agent workstations at a customer premises, comprising steps of:

（a) receiving a call at a telephony switch coupled to a customer local area network (LAN);

(b) forwarding an indication of the received call to a personal computer (PC) at the at least one of the agent workstations connected to the LAN, wherein the PC executes a personal router application having a set of specific personal routing rules for that particular agent workstation on which it resides;

(c) determining routing for the call in the personal router application for the particular agent workstation based on the specific set of routing rules for that workstation; and (d) sending routing commands effecting further routing of the call to the telephony switch as a result of the personal routing determined in step (c).

2. The method of claim 1 wherein the PC includes a video display unit (VDU) and a user interface providing capability for a user to edit routing rules, and including a step for editing routing rules.

3. The method of claim 2 wherein the user interface comprises and on-screen window providing editable script in a high-level language.

4. The method of claim 1 wherein the PC includes a graphical user interface having icons indicating telephone calls received and for choices of disposition of telephone calls received, and including steps for a user to precipitate actions in call routing by iconic drag-and-drop procedures.

5. In a customer premises telephone call-routing system, a method for individual customization of routing rules for an incoming telephone call, comprising steps of:

(a) calling a user interface on a computer connected to a customer LAN, the LAN also coupled to a computerized telephony switch system receiving the incoming telephone call, wherein the telephony switch system broadcasts data associated with the incoming call on the LAN prior to routing the incoming call;

(b) editing routing rules in a routing application residing on the computer, the routing rules stored specifically for routing calls to that specific user at the user interface;

(c) associating the edited routing rules with the broadcast data; and (d) instructing the computerized telephony switch system to route the incoming call according to specific routing determined by the user's edited routing rules.

6. The method of claim 5 wherein the computerized telephony switch system comprises a telephony switch connected to a telephony server in turn connected to the LAN.

7. A Computer Telephony Integration (CTI) application executing on a routing processor for routing incoming calls, the processor connected to a local area network (LAN) having connections to a telephony switch and to a plurality of individual agent workstations in a call center, comprising:

a separate set of routing rules for each individual agent workstation;

wherein the CTI application instructs the telephony switch to route calls to individual agent workstations based on the individual routing rules stored for that specific workstation.

8. The CTI application of claim 7 wherein an interface is provided at an agent workstation for an individual agent to edit routing rules stored for a workstation other than the workstation for that agent.

9. The CTI application of claim 8 wherein routing rules are edited for another workstation by entering a password on the interface prior to editing.

* * * * *